Dec. 14, 1971  T. H. BENZINGER  3,626,757
EAR THERMOMETER

Filed Oct. 24, 1967  3 Sheets-Sheet 2

INVENTOR.
Theodor H. Benzinger
BY

Dec. 14, 1971   T. H. BENZINGER   3,626,757
EAR THERMOMETER
Filed Oct. 24, 1967   3 Sheets-Sheet 3

INVENTOR.
Theodor H. Benzinger
BY

United States Patent Office 3,626,757
Patented Dec. 14, 1971

3,626,757
EAR THERMOMETER
Theodor H. Benzinger, 6607 Broxburn Drive,
Bethesda, Md. 20034
Filed Oct. 24, 1967, Ser. No. 677,794
Int. Cl. G01j 5/12; G01k 13/00
U.S. Cl. 73—355 R
2 Claims

ABSTRACT OF THE DISCLOSURE

This clinical ear thermometer, devised to measure the temperature of the tympanic membrane in man or animals, includes a hollow, cuplike member which has an inner reflecting surface. The opening of this cup has a soft edge, preferably made of deformable material, for gentle, transitory contact with the tympanic membrane. In the optical focal area of the cup, near its bottom, the sensing portion of a temperature measuring device is located. The sensing tip is responsive to infrared in the region of animal or human body temperature. The cup is accommodated at the distal end of a flexible stem which is as long as or longer than the ear canal, and this stem accommodates means for bringing the temperature signal out of the ear canal for recording. The stem also serves for the safe introduction without undue pressure and for the safe removal of the cup from the ear canal.

---

The invention described herein may be manufactured and used by or for the Government of the United States of America for governmental purposes without the payment of any royalties thereon or therefor.

In applicant's U.S. Pat. No. 3,054,397 of Sept. 18, 1962, there is disclosed a method for measuring body temperature for diagnostic and research purposes which involves sensing the temperature of the anterior hypothalamus, a region at the base of the brain stem just above the crossing of the optic nerves which, it has been found, functions to maintain body temperature at a constant value in the presence of environmental temperature changes. In the biological servomechanism system that prevents overheating of the body, the hypothalamus performs as the sensory-receptive organ. It registers the physical quantity that is to be regulated namely, the internal body temperature, and generates nerve impulses commensurate with the magnitude of this stimulus. The effector organs that acs in response to these impulses to maintain the body temperature steady despite warm environmental changes are the cutaneous sweat glands and the peripheral blood vessels.

In order o provide the most meaningful measure of internal body temperature, a measuring site as close as feasible to the hypothalamus should be selected. Applicant's patent suggests that the tympanic membrane serve as this location since it can be conveniently reached via the external auditory canal. Measurements made at this site have been verified as essentially representing cerebral, and therefore, hypothalamus, temperature by simultaneous measurements made at other intracranial locations.

The above patent recommends that the temperature sensor be placed in contact with the tympanic membrane and kept in contact during the measuring period. This technique provides the best indication of internal body temperature. To prevent any damage to the membrane, the sensor is constructed with a blunt, terminal, loop, the thermojunction is located at the bend of this loop, and the tubing which forms this loop has a stiffness which causes buckling to occur before any appreciable force may be transmitted to the membrane.

While the above arrangement does provide an effective safeguard against improper use of the temperature probe, occasionally a patient is annoyed by the pressure of this probe against his tympanic membrane. In an effort to avoid this shortcoming, it has been suggested that the temperature in the ear canal be used as a substitute for the tympanic measurement. Unfortunately, the temperature measurements made in the ear canal are inferior to tympanic measurements. It has been applicant's experience that the temperature must be derived from the membrane directly and cannot be replaced by measurement of "black body" radiation in the ear canal.

The clinical ear thermometer of the present invention permits the temperature of the tympanic membrane to be measured without the annoyance resulting from prolonged contact with this membrane. With the method of the present invention, there is an initial contact between the ear thermometer and the membrane, but this contact is made very briefly in order to manipulate the sensor to its proper position which may be approximately one millimeter away from the membrane. This transitory contact is necessary since the probe preferably should be as close as possible to the membrane without actually touching it. The best way of accomplishing this is to bring the probe to the membrane and then back it off until the patient reports contact has been broken.

With the present invention, the exploratory contact with the membrane is not concentrated at one point on the membrane. Rather, it is distributed over a somewhat large area. As an additional safeguard and one calculated to further minimize any uncomfortable feeling experienced by the patient during the positioning of the probe, that portion of the probe which makes this contact is made of a soft, deformable material that collapses with increasing pressure but resumes its original shape when this pressure is reduced or removed.

It is accordingly a primary object of the present invention to provide a clinical ear thermometer for measuring the temperature of the tympanic membrane which does not require contact with this membrane for its operation.

Another object of the present invention is to provide a clinical ear thermometer which may be manipulated to its operating position in the auditory canal with little discomfiture to the patient.

Another object is to provide a new and improved method for measuring the temperature of the tympanic membrane which causes a minimum of disturbance to the patient.

A yet still further object of the present invention is to provide a clinical ear thermometer which senses the temperature of the tympanic membrane and is substantially unaffected by the temperature of the ear canal.

Other objects, advantages and novel features of the invention will become apparent from the following detailed description of the invention when considered in conjunction with the accompanying drawings wherein.

Figure 1:
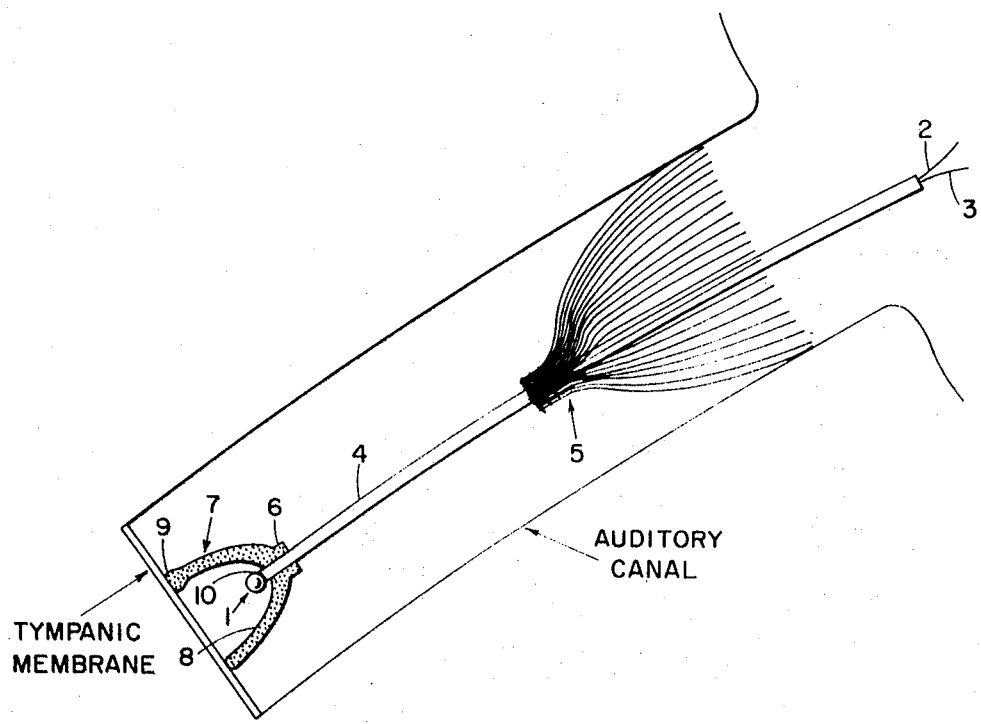
FIG. 1 illustrates one embodiment of the clinical ear thermometer at its initial position within the auditory canal and contacting the tympanic membrane.

Referring now to FIG. 1 of the drawings, it will be seen that the clinical ear thermometer has as its thermal sensor, in one embodiment of the invention, a bead of solder 1 which interconnects the ends of two conductors 2 and 3, each made from a different thermally electric material, such as, for example, copper and constantan. Bead 1 acts as a collector for the thermojunction so formed, and its surface is blackened or otherwise treated so as to better absorb any of the radiant energy impinging thereon.

Conductors 2 and 3 are accommodated within a length of insulated tubing 4 made, for example, of flexible polyethylene. The stiffness of this stem is just sufficient to permit insertion of the probe into the ear canal without difficulty. No appreciable force or pressure can be transmitted along this member without its bending or buckling. This characteristic safeguards the tympanic membrane against possible injury should the probe be used improperly. Secured to the stem at an appropriate location is a crown of bristles 5 for retaining the probe in place within the ear canal. The details of this retaining device and other equivalent means for performing this function are disclosed in applicant's U.S. Pat. No. 3,156,117 of Nov. 10, 1964.

The terminal portion of stem 4 is inserted through the base 6 of a hollow cup 7. In the embodiment of FIG. 1, this radiant energy collector is made of a soft, compressible, resilient material, such as foam rubber having very small air-filled cells. Its inner surface 8, which may be a paraboloid or other shape permitting collimation of rays that enter the opening, is suitably coated or otherwise treated so as to reflect radiant energy impinging thereon. Its rim edge 9 is rounded so that when this part of the probe first touches the tympanic membrane, a gentle, distributed contact is made. With increasing pressure, this edge flattens to absorb some of the applied force and further spread the contact over a somewhat larger area of the membrane. Because of the nature and extent of the contact, there is little likelihood of the patient experiencing any discomfiture during this preliminary adjustment of the ear thermometer. If the probe is moved against the tympanic membrane with too great a pressure, the edge of cup 7 will tend to collapse inwardly and form a protection barrier between the membrane and bead 1. Even if this barrier is not formed, stem 4 will buckle before the applied pressure reaches an injurious level.

Radiant energy collector 7 should be made of a material which also has a low thermal conductivity, so that it does not conduct, to an appreciable extent, heat between the walls of the auditory canal and the sensor.

The inside surface of the radiant energy collector may take a variety of shapes. If, for example, it is ellipsoidal, the temperature sensor should be located at one focal area and the probe, itself, positioned within the auditory canal so that the tympanic membrane lies at the other focal area. Since the membrane and the temperature sensor are the only "black" bodies in the measuring system, a radiation exchange will take place between these objects. Thus, radiation emanating from the membrane will experience multiple internal reflection within the collector until it is entirely absorbed by the temperature sensor. It is not necessary, therefore, for the collector to act as a focusing means to direct all of the radiant energy directly on the absorber.

Bead 1, in one preferred embodiment, is made with a diameter somewhat larger than the internal diameter of tubing 4. With this relationship, bead 1 may be retained against the inner circumferential edge 10 of the stem with a minimum of contact therebetween. This feature reduces the amount of heat transferred by thermal conduction from the bead to the other parts of the probe. It also spaces the sensor from the electrically conducting inner surface 8. Any suitable epoxy resin may be used to fasten conductors 2 and 3 inside tubing 4 to prevent any movement of bead 1 once it has been positioned at the location shown in FIG. 1. With bead 1 in place, stem 4 may be moved longitudinally within base 6 until the sensor is located at the focal area of the reflective cup. At this site and with the inner surface of the cup of paraboloidal shape, for example, bead 1 intercepts all of the radiant energy which enters the open end of this cup in a direction parallel to the longitudinal axis of symmetry of the paraboloid and is internally reflected off of the coated surface 8. Stem 4 may then be secured to base 6 by any suitable means.

It will be appreciated that the stem portion 4 of the ear thermometer may either be a tubular member with the conductors accommodated therein or a solid member with the conductors embedded therein. A solid stem, of course, should possess the necessary flexibility and stiffness to duplicate the behavior of its tubular equivalent. It will be appreciated also that the "sensor" or temperature-sensitive tip upon which the radiant energy from the tympanic membrane is directed or reflected, may be of any conceivable type of thermometric principle, thermoelectric, resistance-electric, infrared-photoelectric, or based on the expansion of solids, liquids or gases, or on the changing properties of crystals with temperature, or any other temperature-dependent variability of matter suitable for measurement, for recording or for wireless transmission of temperature data.

The operation of the ear thermometer is as follows: The probe, held along the rear portion of stem 4, is moved forward through the ear canal with a gentle, twisting movement until edge 9 makes contact with the tympanic membrane. As this contact increases in intensity, the soft edge of cup 7 partially collapses and the probe comes to rest with the entire circular edge of the cup contacting the membrane as shown in FIG. 1. On feeling this touch, the wearer lets the ear thermometer slip back by, for example, one millimeter, or until the contact is just lost. Once the cup is free of the membrane, edge 9 is restored to its rounded configuration. Cup 7, itself, if made entirely of resilient material, may have experienced some minor deformation during this preliminary positioning of the probe. It, too, regains its original shape due to the elasticity of the material from which it is made. Consequently, its reflecting interior surface 7 is properly shaped to focus all of the entering radiation onto bead 1.

It will be appreciated that bead 1 views only the tympanic membrane since it is responsive to radiation coming through the open end of cup 7. It cannot see parts of the wall of the ear canal. Moreover, any radiation from the ear canal is prevented from reaching bead 1 by the insulating effect of the body portion of cup 7.

The accuracy of measurement attainable with applicant's ear probe is enhanced because little of the heat in the measuring system is carried away by conduction. Bead 1, because of its edge mounting, has poor thermal contact with stem 4. Thus, little heat passes from the sensor via the tubing outside of the system. Moreover, cup 7 provides strong insulation against any heat loss from the interior of the cup to the ear canal. By the same token, as mentioned hereinbefore, this member prevents any energy originating at the ear canal from entering the system and being measured by the sensor. As a further preventative, conductors 2 and 3 of the thermocouple are made of extremely thin wire, such as, for example, gauge 36. These conductors also are well insulated from the wall of the ear canal by tubing 4.

The thermocouple portion of the probe, therefore, assumes the temperature of the tympanic membrane. It does not disturb the temperature of this membrane. Since the membrane is protected against any heat loss by the probe, it assumes the temperature of the arterial blood supplied to it. This temperature, after a short period of adjustment, equal the temperature of the venous blood. Hence, the temperature of the internal carotid blood will be correctly measured without any physical contact between the probe and the tympanic members.

Figure 2:
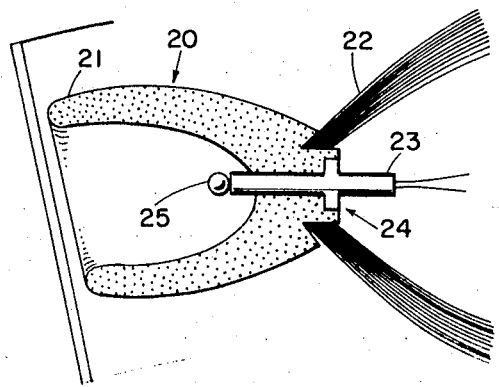
FIG. 2 is a magnified view of the terminal portion of another type probe.

FIG. 2 illustrates an alternative probe construction wherein the radiant energy collector 20 has an ellipsoidal inner surface and its rim portion 21 is cut off at an oblique angle. This angular provision permits the collector to be brought nearer to the tympanic membrane since this membrane is at a similar angle with respect to the auditory canal.

In this embodiment, bristles 22 are set into the base portion of member 20. Since the retaining means is near the forward end of the probe, the apparatus remains firmly in place once it has been set at its proper location within the auditory canal. Cup 20 is also detachably connected to stem 23 by means of a suitable bayonet or equivalent connection 24. Hence, this portion of the probe may be discarded once it has been contaminated by use.

To make sure collector 20 is properly orientated during the measuring operation, it should be brought against the membrane, then backed off, rotated approximately 180°, then brought against the membrane a second time. Of the two positions, that one at which the probe sits deeper in the auditory canal is the correct one.

Figure 3:
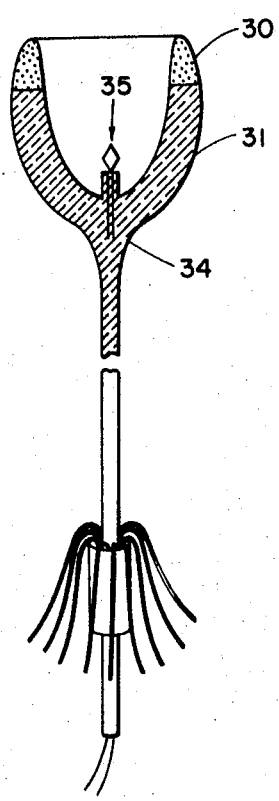
FIG. 3 shows an alternative radiant energy collector construction which may be used in the ear thermometer.

There is the possibility with the apparatus of FIGS. 1 and 2 that the forward part of the cup member may fold back on itself and assume an inside-out condition if this portion of the ear thermometer is brought up against the tympanic membrane with too great a force. If this happens, the tympanic membrane will be directly exposed to the end of the temperature sensor. Although stem 4 should preclude any subsequent contact between this element and the membrane by buckling, the possibility of injury is, nevertheless, present. To avoid this, cup 7 may be constructed as shown in FIG. 3. Here, only the rim edge 30 of the cup is made of a soft, compressible, resilient material. The main body portion 31 is made of a nondeformable material, such as polystyrene foam. Consequently, with this construction, there is no chance of the cup being inverted.

Instead of having the tubing and the cup-shaped member separate elements, these components, as perhaps best shown in FIG. 3, may be part of the same unitary structure. For example, stem 34 may be flared at one end thereof to form the radiant energy collecting portion 31. The internal shape of cup 31 is paraboloidal in this modification, and temperature sensor 35 is positioned at its focal area. Bristles, or any other device, for releasably retaining the probe within the ear canal, may be connected to the rim portion of the cup-shaped member or any other point along its outer surface.

Figure 4:
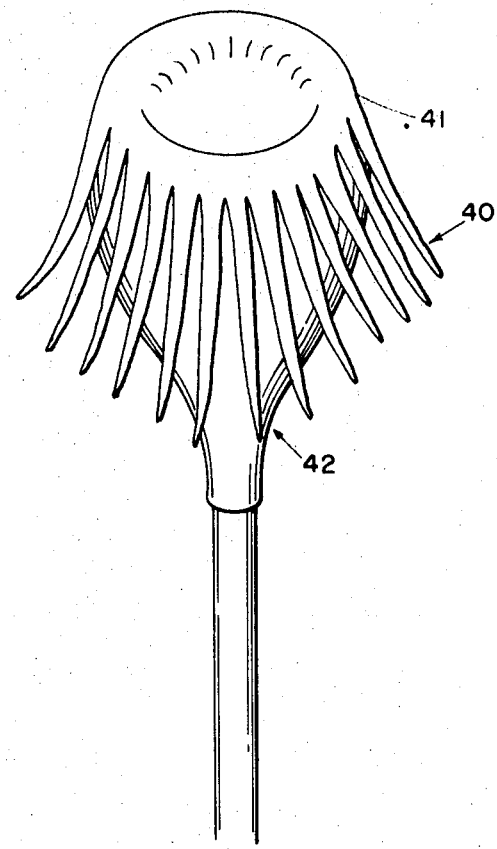
FIG. 4 illustrates another embodiment of the probe.

In FIG. 4 there is illustrated an embodiment of the invention wherein the retaining means, spikelike projections 40, originate from the edge 41 of the cup-shaped member 42.

Figure 5:
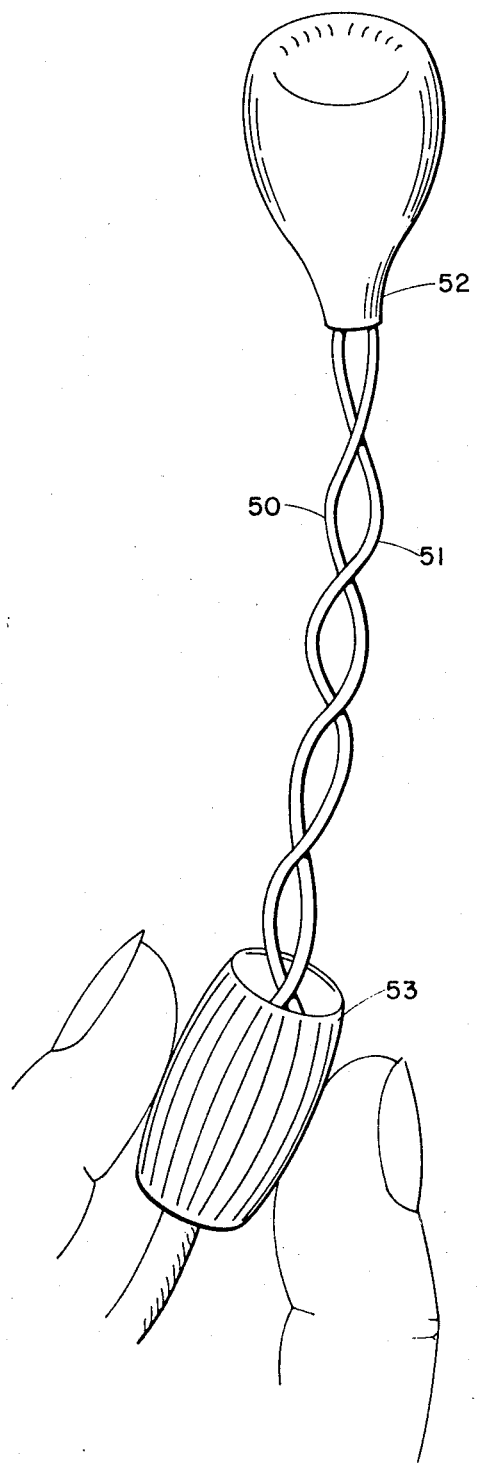
FIG. 5 shows an embodiment employing cooperating helical members for facilitating the safe introduction of the probe into the ear canal.

FIG. 5 shows an embodiment wherein the single stem member of the previous modifications is replaced with a pair of helical members 50 and 51 which are entwined with their ends connected to the base of the cup-shaped member 52 and to a sleeve 53. Each of these members may accommodate one of the conductors of the thermocouple. It will be appreciated that when sleeve 53 is turned in one direction as the probe is introduced into the auditory canal, the tubular members will stiffen and permit collector 52 to advance towards the tympanic membrane. If, on the other hand, sleeve 53 is turned in an opposite direction, these members will untwist and relax and permit the terminal portion of the probe to be gently withdrawn from the auditory canal. Here, the radiant energy collector 52 is pear or drop-shaped in order to facilitate movement of the probe around any "corners" in the auditory canal.

The outer surface of all collectors preferably should be sleek. A soft, rounded edge, such as shown in FIG. 5, also avoids scraping of any wax from the auditory canal.

It would be pointed out in connection with some of the modifications previously described that if the retaining means is positioned remote from the radiant energy collector, somewhere along the flexible stem member, FIG. 1, the intervening portion of this member between these elements, permits easy passage of the probe through the auditory canal. In other words, this section is free to bend or turn to follow the tortuous passageway leading to the tympanic membrane.

Figure 6:
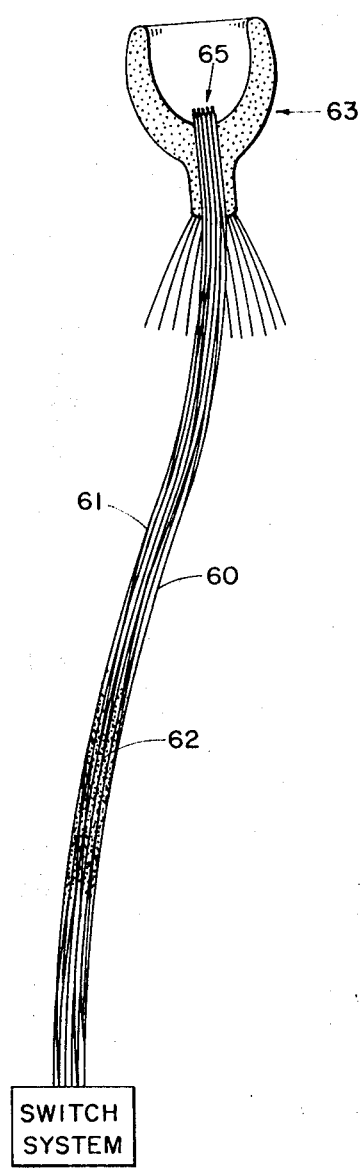
FIG. 6 illustrates an ear thermometer employing a thermopile as the temperature sensing element.

Instead of employing a single, thermal junction as the temperature-sensitive portion of the clinical ear thermometer, a series of such junctions or a thermopile may be used. This would increase the sensitivity of the apparatus but make its manufacture more expensive. Consequently, as shown in FIG. 6, such a thermopile 65 should preferably be employed with a disposable, radiant energy collector of any of the geometries previously discussed. Since the thermopile requires a multiplicity of pairs of conductors, such as 60, 61 and 62, these conductors may be bonded or otherwise joined together to serve as the stem means previously described. Thus, the radiant energy collector 63 could be mounted directly on these conductors in a detachable manner and the cable of conductors would provide the means for positioning the probe at its proper locale.

This thermopile may be connected to the indicating instrument or recorder by the thermopile switching system disclosed in applicant's U.S. Pat. 3,099,923 of Aug. 6, 1963. Such an arrangement would merely require the remote thermojunctions of the thermopile to be embedded in a metallic block and electrically insulated therefrom.

Instead of employing a thermocouple as the temperature sensor, the probe, as mentioned hereinbefore, may use a thermistor bead in the modification of FIG. 1. Such a bead would have a substantially spherical configuration and could be mounted in the same fashion as bead 1 of the thermocouple.

It would also be pointed out that the terminal end portion of the stem member may be formed into a male element of a connector assembly of the type shown in applicant's U.S. patent application, Ser. No. 490,748, filed Sept. 27, 1965, now Pat. No. 3,416,973, by flattening this portion of the device into an elongated, rectangular strip and having the conductors of the thermocouple arranged on opposite sides of this strip and oppositely offset from the center line thereof.

In one practical embodiment of the invention, the flexible tubing had a 0.011-inch inside diameter and a 0.024-inch outside diameter, which dimensions gave the tubing the proper stiffness. The overall length of the probe was an inch and a half.

Since the present invention is directed to the clinical ear thermometer itself and not to the electrical measuring circuit associated with it, no details of this circuit will be described. However, it would be pointed out that the measuring system may take the form of that described in applicant's U.S. Pat. No. 3,054,397, identified hereinbefore.

Obviously many modifications and variations of the present invention are possible in the light of the above teachings. It is therefore to be understood that within the scope of the appended claims the invention may be practiced otherwise than as specifically described.

What is claimed is:

1. In a method of measuring the internal body temperature of an individual, the steps of
   introducing into the auditory canal of said individual a cup-shaped, radiant energy collector which has a temperature sensor positioned therein;
   moving said collector forward until its rim portion touches the tympanic membrane of said individual whereby this contact between the collector and the tympanic membrane is not concentrated at one point on said tympanic membrane;
   backing said collector off said membrane to a position whereat said temperature sensor views only the tympanic membrane through the opened end of said cup-shaped, radiant energy collector; and
   maintaining said cup-shaped, radiant energy collector in this last-mentioned position during the temperature measuring operation.

2. A clinical ear thermometer comprising, in combination, a cup-shaped member;

radiant energy reflecting means covering the inside surface of said cup-shaped member;

a tubular, flexible stem, one end portion thereof being connected to and passing through the base portion of said cup-shaped member so as to extend into the interior thereof a short distance, said tubular, flexible stem serving as a means for inserting said cup-shaped member into the auditory canal of an individual whose temperature is being measured;

a temperature-sensing means positioned within said cup-shaped member at a distance away from the bottom thereof, said temperature-sensing means being in contact with the inner circumferential edge of said one end of said tubular, flexible stem whereby the heat conducted from said temperature-sensing means to said tubular, flexible stem is minimized, said temperature-sensing means having output conductors which are accommodated within said tubular, flexible stem.

References Cited
UNITED STATES PATENTS

| | | | |
|---|---|---|---|
| 1,099,199 | 6/1914 | Parker | 73—355 |
| 2,813,203 | 11/1957 | Machler | 73—355 X |
| 3,054,397 | 9/1962 | Benzinger | 73—359 U X |
| 3,156,117 | 11/1964 | Benzinger | 73—362 R X |
| 3,266,313 | 8/1966 | Litterst | 73—355 |
| 3,274,994 | 9/1966 | Sturm | 116—101 X |
| 3,282,106 | 11/1966 | Barnes | 73—355 |
| 3,309,236 | 3/1967 | Gunji | 73—355 X R |

LOUIS R. PRINCE, Primary Examiner

F. SHOON, Assistant Examiner